US010217037B1

(12) United States Patent
Di Iorio et al.

(10) Patent No.: US 10,217,037 B1
(45) Date of Patent: Feb. 26, 2019

(54) SYSTEMS, METHODS AND DEVICES TO FACILITATE SECURE PURCHASES OF CRYPTOCURRENCIES

(71) Applicant: DECENTRAL INC., Toronto (CA)

(72) Inventors: Anthony Di Iorio, Toronto (CA); Shu Wang, Toronto (CA); Addison Taylor Cameron-Huff, Toronto (CA)

(73) Assignee: DECENTRAL INC., Toronto (CA)

( * ) Notice: Subject to any disclaimer, the term of this patent is extended or adjusted under 35 U.S.C. 154(b) by 4 days.

(21) Appl. No.: 15/711,312

(22) Filed: Sep. 21, 2017

(51) Int. Cl.
*G06K 19/00* (2006.01)
*G06K 19/04* (2006.01)
*G06Q 20/28* (2012.01)
*G06K 19/06* (2006.01)

(52) U.S. Cl.
CPC ..... *G06K 19/041* (2013.01); *G06K 19/06028* (2013.01); *G06K 19/06037* (2013.01); *G06Q 20/28* (2013.01)

(58) Field of Classification Search
CPC .............................. G06Q 20/00; G06Q 20/04
USPC ........................................ 235/379, 380, 494
See application file for complete search history.

(56) References Cited

U.S. PATENT DOCUMENTS

| 2003/0069856 A1* | 4/2003 | Seifert | G06Q 20/00 |
| | | | 705/73 |
| 2004/0164145 A1* | 8/2004 | Licciardello | G06Q 20/04 |
| | | | 235/381 |
| 2004/0205023 A1* | 10/2004 | Hafer | G06Q 20/04 |
| | | | 705/43 |
| 2011/0196787 A1* | 8/2011 | Alroy | G06Q 20/065 |
| | | | 705/41 |

OTHER PUBLICATIONS

How to Buy Bitcoin With a Flexepin Voucher; Article; 2017; 3 Pages; https://www.bitaccess.co/buy-bitcoin-with-flexepin-voucher.
Coinplug to Roll Out World's Biggest Convenience Store Bitcoin Scheme; Article; 6 Pages; http://www.coindesk.com/coinplug-sell-bitcoin-cards-24000-korean-convenience-stores/.
Jaxx by Decentral; 7 Days of Jaxx: What's in the Box; Blog; May 29, 2016; 3 Pages; http://decentral.ca/tag/jaxx-coin-card/.

* cited by examiner

*Primary Examiner* — Daniel A Hess

(57) ABSTRACT

There is provided a physical redemption device such as a card and a system for purchasers to buy cryptocurrencies through a digital sale system. Cards are printed and packaged using a printer system to include a (secret) unique redemption code in a tamper resistant/tamper evident manner as well as a viewable unique verification code. The cards are distributed through retailers, similar to gift cards, for redemption via an online store or mobile application. Retailers activate the cards for purchasing. The redemption process is provided by an electronic interface (e.g. software system) that provides access to buy a cryptocurrency, preferably from among many different kinds of cryptocurrencies. Redemption uses the respective redemption code applied to each card. The verification code may be used to verify the authenticity and redeemability of the card prior to or after purchase.

31 Claims, 7 Drawing Sheets

SYSTEMS, METHODS AND DEVICES TO FACILITATE SECURE PURCHASES OF CRYPTOCURRENCIES

FIELD

This disclosure relates to the production, distribution, and use of tamper resistant pre-paid cards to purchase cryptocurrencies and more particularly to systems, methods and devices to facilitate secure purchases of cryptocurrencies.

BACKGROUND

There are various known manners to provide cryptocurrencies for sale to individuals and other desiring to purchase cryptocurrency. One such manner is to provide an Automated Teller Machine (ATM) or ATM-like machine that sells and may buy a cryptocurrency such as Bitcoin™ in exchange for an amount of fiat currency. These machines are expensive to buy and require a fair bit of maintenance, manual removal of cash, connection with an exchange, and many other ongoing items. In short, it is an expensive business model to scale ATMs to service more customers in more locations.

Another known manner is to provide a purchaser (e.g. in exchange for fiat currency) with a prepaid printed card or ticket having a code that is redeemed via an electronic interface such as to a cryptocurrency wallet to obtain the cryptocurrency. Known prepaid printed cards or tickets may be insecure. They are not verifiable by purchasers or consumers prior to purchasing.

SUMMARY

There is provided a physical card device and system that allows purchasers to buy one or more different kinds of cryptocurrencies through a digital sale system. Cards are printed and packaged using a printer system (e.g. substrate feeder, printer, opaque covering station, conveyor belt, optical verification unit(s) and packaging station along with associated software) that ensures that cards are manufactured properly and securely. The cards include a redemption code in a tamper resistant/tamper evident manner as well as a verification code. The cards are distributed to retailers to sell to purchasers, similar to gift cards, for redemption via an online store or mobile application (app). Retailers activate the cards, collect cash or other payment (e.g. credit, debit, gift card redemption, etc.) and dispense the cards, similar to lottery tickets or other cash-like products. The redemption process is provided by an electronic interface (e.g. software system) that provides access to buy a cryptocurrency and preferably to buy many different kinds of cryptocurrencies using a respective redemption code applied to each card. The verification code may be used to verify the authenticity and redeemability of the card prior to purchase.

There is disclosed a redemption device carrying one or more codes, the device comprising: a substrate having a face; a redemption code applied to a first portion of the face of the substrate; a verification code applied to a second portion of the face or another face of the substrate; and an opaque covering applied to the first portion to hide the redemption code leaving the verification coded visible, the covering applied in a manner such that a removal reveals the redemption code.

There is disclosed a process to produce a redemption device carrying one or more codes, the process comprising: providing a substrate having a face; applying a redemption code to a first portion of the face of the substrate; applying a verification code to a second portion of the face or another face of the substrate; and applying an opaque covering to the first portion to hide the redemption code leaving the verification coded visible, the covering applied in a manner such that a removal reveals the redemption code.

There is disclosed a production system for a redemption device carrying respective unique verification and redemption codes, the production system comprising: a code application station to apply the respective unique verification and redemption codes to respective redemption devices, the code application station receiving the codes from a computing device coupled to a data store storing the respective unique verification and redemption codes in association in respective pairs, the pairs associated with a respective activation status; wherein the code application station is configured to: receive one pair of the respective unique verification and redemption codes; apply a unique redemption code of the one pair to the first portion of the substrate; and, apply the unique verification code of the one pair to a second portion of the face or another face of the substrate; and an opaque covering station configured to receive the substrate and apply an opaque covering to the first portion to hide the unique redemption code leaving the unique verification code visible, the covering applied in a manner such that a removal reveals the unique redemption code.

There is disclosed a redemption device activation system to facilitate fraud and tamper detection, the system having a processor, a communication subsystem and a memory each in communication with the processor, the memory storing instructions which, when executed by the processor, configure the redemption device activation system to: communicate with a data store storing unique redemption codes and unique verification codes stored in association in respective pairs, the pairs of codes applied to respective redemption devices, where the unique redemption codes are not visible but revealable and the verification codes are visible and wherein at least some of which redemption devices are distributed for delivery to users through one or more channels; receive via the communication subsystem an activation request for one or more of the respective redemption devices; and activate the one or more of the respective redemption devices by updating a respective activation status associated with each of the respective unique verification codes, the status updated to indicate the respective redemption device is activated with redemption code ready for use.

There is disclosed a redemption device verification system to facilitate fraud or tampering detection having a processor, a communication subsystem and a memory each in communication with the processor, the memory storing instructions, which when executed by the processor, configure the redemption device verification system to: communicate with a data store storing unique redemption codes and unique verification codes stored in association in respective pairs, wherein the pairs of codes are applied to respective redemption devices where the respective verification codes are visible and the respective redemption codes are not visible on each of the respective redemption devices; wherein at least some of the respective redemption devices are distributed for delivery to users through one or more channels; and wherein the data store stores a respective activation status with each of the pairs of codes; receive via the communication subsystem a verification request for one of the respective redemption devices; determine the respective activation status from the data store; provide a reply that is responsive to the activation status.

There is disclosed a redemption system to redeem a redemption device, the redemption system having a processor, a communication subsystem and a memory each in communication with the processor, the memory storing instructions which, when executed by the processor, configure the redemption system to: communicate with a data store storing unique redemption codes and unique verification codes stored in association in respective pairs, wherein the pairs of codes are applied to respective redemption devices where the respective verification codes are visible and the respective redemption codes are not visible but revealable on each of the respective redemption devices; wherein at least some of the respective redemption devices are distributed for delivery to users through one or more channels; and wherein the data store stores a respective activation status and prepaid amount with each of the pairs of codes indicating whether or not the respective redemption device is activated with redemption code ready to use; receive via the communication subsystem a redemption request for one of the respective redemption devices including a respective redemption code; determine the respective activation status from the data store; authorize the redemption using the prepaid amount at activation status and provide a reply in accordance with the redemption; if the redemption is authorized, set the respective activation status accordingly.

These and other aspects will be apparent including computer program products which store instructions in a non-transient manner (e.g. in a storage device) which when executed by a computing device configure the device to perform operations as described herein.

While references to "an embodiment" are used herein, nothing should be implied or understood that features of one embodiment cannot be used or combined with features of another embodiment unless otherwise stated. The various systems, methods and devices shown and described herein may be used together unless otherwise stated.

DETAILED DESCRIPTION

Figure 1A:
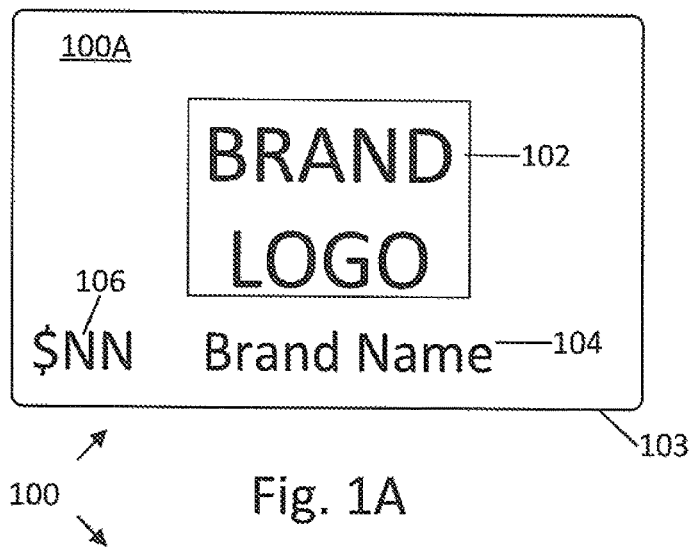
FIGS. 1A-1C are illustrations of an example redemption device (e.g. prepaid card or ticket), in accordance with an embodiment.
Figure 1B:
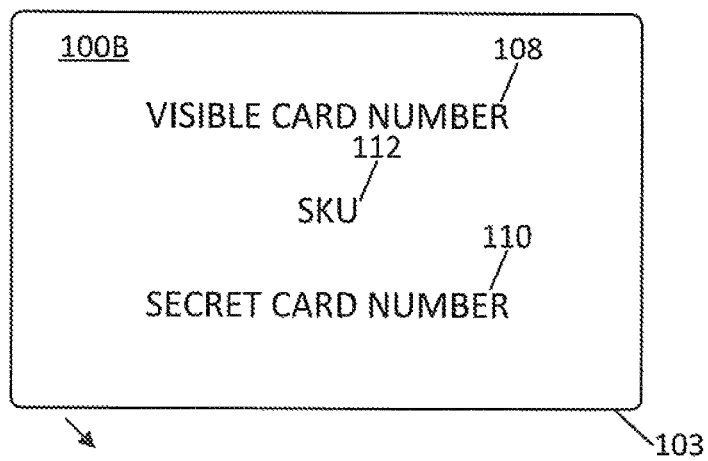
Figure 1C:
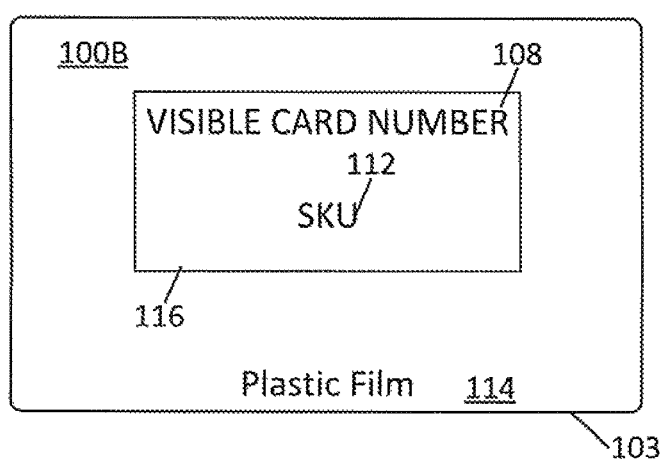

FIGS. 1A-1C are illustrations of an example redemption device 100, in accordance with an embodiment. FIG. 1A shows a first face 100A while FIG. 1B and FIG. 1C show an opposite face 100B. FIG. 1C has a plastic film applied to or over a substrate 103 of device 100 as described further to obscure certain information. FIG. 1A comprises a gift-card like (pre-paid card) device, typically a substrate of a plastic material (though other substrate materials may be used). Polyvinylchloride (PVC) or other plastic may be used.

Face 100A shows various information in various regions such as a brand logo 102, a brand name 104 and a fiat currency denomination and amount 106 where NN is a place holder for a number such as 10, 20, 50, 100 etc. Other information and indicia may be displayed as may be desired. On face 100B there is shown various information, typically codes, such as a visible card number 108, secret card number 110 and SKU 112. Other information (not shown) may be displayed on face 100B such as contact information, contractual information, etc.

The information and indicia etc. may be printed on the card stock (substrate) or applied by other means. Repeatable information that appears on all devices 100 may be pre-printed. Information on face 100A and some information on face 100B is the same for all similar denomination cards and pre-printed stock stored for production runs to make devices 100 for distribution as described. This pre-printed stock may be obtained from a third party provider and the information unique to each card applied in a secure production environment.

FIG. 1C shows a plastic film 114 applied over face 100B. Film 114 covers secret card number 110 and provides a window 116 exposing visible card number 108 and SKU 112. Other information may also be exposed but it is important that the secret card number 110 be hidden when the device 100 is distributed as further described. It is also preferably that this is hidden shortly after it is applied so that even when stored before distribution it is not visible. While if FIG. 1C the film is applied on face 100B such as using an adhesive backed film, it may be applied over face 100B using shrink wrapping techniques, etc.

Visible card number 108 is a unique verification code applied to a first portion of the face 100B of the substrate. Secret card number 110 is a unique redemption code applied to a second portion of the face 100B. The redemption code could be on another face of the substrate and the film applied to that face. The film 114 is an opaque covering applied to the first portion to hide the redemption code leaving the verification coded visible. Preferably, the covering is defined or applied in a manner such that a removal reveals the redemption code but can't be replaced exactly as it was. That is, replacement of the same film after its removal is detectable. For example, the film may stretch if removed (picked and pulled off in whole or in part) so that replacement is detectable to the eye or touch or both. The covering may be adhesively applied or applied in other ways (e.g. heat shrink).

The substrate (through one or more of size, shape, and substrate material configuration, etc.) may define a card or other product such as a ticket.

One or both of the redemption code and verification code may comprise one of: a code comprising characters or symbols of a language, e.g. including numeric characters and a machine-readable optical code comprising a 1D or 2D barcode. Other codes may be used (e.g. other image encoded data, etc.) In some examples, the redemption code may also be coded in magnetic form.

The redemption code and verification code are a pair of codes. They are stored in a data store in association with one another and in association with an activation status such that the verification code is usable to look-up the activation status. They are also stored in association with a respective fiat currency amount 106 as printed on the device 100. In accordance with one example, which is preferred, the redemption code is a one-time use code to fully redeem the fiat currency amount of the device. When the redemption code is used the activation status is settable in the data store to indicate the redemption code is no longer usable. The activation status may comprises one of three states: not activated, activated with redemption code ready for use and activated with redemption code used. In another example, the redemption code may be used more than once to redeem up to the total prepaid fiat currency amount using partial amounts. The amount used with each redemption may reduce the available amount. An additional activation status may be used (e.g. stored) such as activated with partial amount remaining.

The redemption code may be stored in a data store in association with an activation status such that when the redemption code is provided to make a purchase of an amount of cryptocurrency, the activation status is determinable from the database and, responsive to the status (e.g. if the status is activated with redemption code ready for use or with partial amount remaining), a transfer of the cryptocurrency is authorizable to a purchaser. The activation status is settable to indicate the redemption code is used or to indicate that a partial amount remains.

The SKU is assistive for merchant use in a distribution chain, identifying a type of redemption device for example for use in inventory/POS systems.

Figure 2:
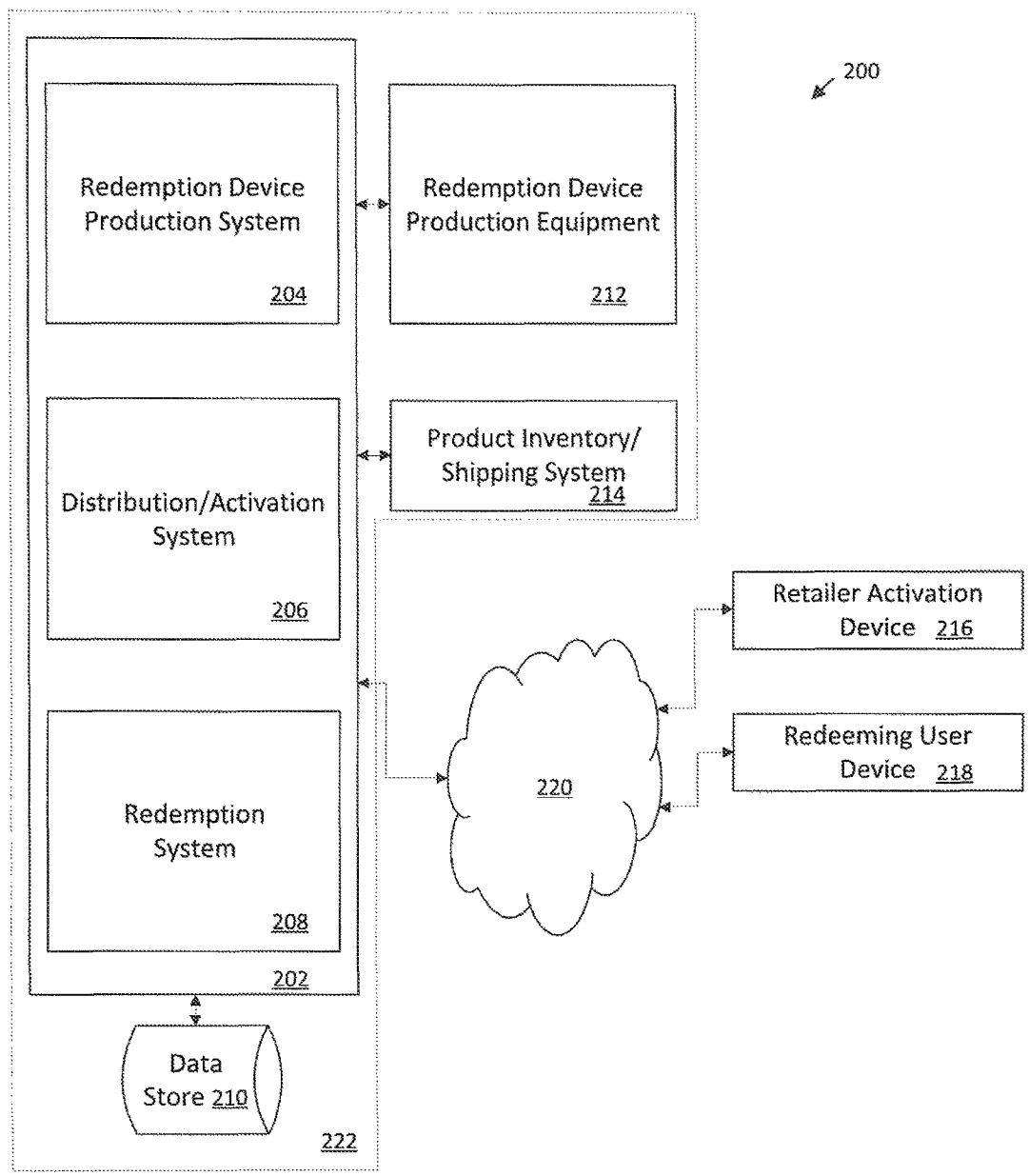
FIG. 2 is a block diagram of a production, distribution and redemption system for a redemption device, in accordance with an embodiment.

FIG. 2 is a block diagram of a production, distribution/activation and redemption system 200 for a redemption device 100, in accordance with an embodiment. There are three major phases for the system 200: making redemption devices, getting redemption devices into the hands of customers, and finally the redemption by the customer of the redemption devices (e.g. for cryptocurrency). There is shown a computer system 202 comprising one or more component (computer) systems (e.g. as software or separate computer systems) such as redemption production system 204, distribution/activation system 206 and redemption system 208. Computer system 202 is coupled to data store 210 (e.g. a relational database). Computer system 202 is also coupled to redemption device production equipment 212 and product inventory/shipping system 214. A retailer activation device 216 and a redeeming user device 218 are coupled to computer system 202 via a network 220 such as the internet represented. Though only one of each devices 216 and 218 are illustrated it is understood that a plurality of each such devices may be coupled to system 202 or respective retailers and redemption device recipients who wish to redeem a redemption device 100. The couplings may be wired or wireless and via public, private of a combination of public and private networks. It is understood that the couplings for devices 216 and 218 may be made when needed and are not necessarily permanently or long term coupled to system 202.

Computing device 202, data store 210, production equipment 212 and product inventory/shipping system 214 (collectively issuing entity system 222) may be managed by a redemption device issuing entity. Issuing entity system 222 is usually managed in a secure environment (physically and electronically), though not necessarily in a single location.

Though not shown in detail, any of the individual components 204-214 of issuing entity system 222 may be configured as servers or other computing devices with communication capabilities configured to provide the features and functions described herein. As is well-known, such computing devices comprise one or more processing units, one or more memory or storage devices coupled thereto storing instructions (usually in the form of software (e.g. an operating system, applications, utilities, etc.), which when executed by the one or more processing units configure the respective computing devices to perform operations (e.g. a method or process). The computing devices may have input, output and/or I/O devices coupled thereto such as pointer devices, keyboards, microphones, speakers, display screens, gesture based I/O devices. Often such systems have one or more communication systems (e.g. buses, antennae, etc.) for internal and external communications. A computing device of the production equipment 212 may interface with production printers, optical verifiers, conveyors and the like.

Retailer activation device 216 and redeeming user device 218 are also computing systems, with similar components as described, albeit different instructions. Retailer activation device 216 may be a POS terminal at a point of sale coupled to a retailer server or other device (which may couple to system 202). It may be a personal device such as a laptop, tablet, personal computer or smartphone. Redeeming user device 218 may be a personal device as well. Retailer activation device 216 is managed by a retailer to activate new redemption devices 100 for providing (e.g. selling) to purchasers. Redeeming user devices (e.g. 218) are managed by those who wish to redeem a redemption device 100 or verify that such a redemption device 100 is valid/unused. This may be a purchaser or other person who receives a device 100 such as via a gift or resale or a person who wishes to verify device 100, whether before or after a purchase or other receiving of the redemption device 100.

Redemption device production system 204 interfaces with production equipment 212 to produce redemption devices 100. Distribution/activation system 206 interfaces with product inventory/shipping system 214, for example to manage distribution to retailers. It also interfaces with retailer activation devices 216 to activate new devices 100 prior to a purchase/sale by the retailers. Redemption system 208 may interface with redeeming user devices (e.g. 218) to control redemption. It may also interface with a redeeming user device 218 to verify that a device 100 is valid and unused.

Though not shown, any of the components of issuing entity system 222 may be configured as web servers or cloud servers to provide services such as to retailers and verifiers/redeemers. Other interfaces may be provided as well such as for (native) applications executing on respective devices 216 and 218 and communicating for the respective activation and redemption/verification services/functions.

Though shown as distinct components or systems within issuing entity system 222, one computing device may provide more than one function or service of such systems. Similarly the functions or features of any one system as described may be configured as more than one computing device. Bright line distinctions may not apply.

It will be apparent that there are three major phases for the system 200: making redemption devices 100, distributing redemption devices 100 into the hands of customers through retailers, including activating the redemption devices 100, and finally the redemption by the customer or other recipient (e.g. for cryptocurrency).

Figure 3:
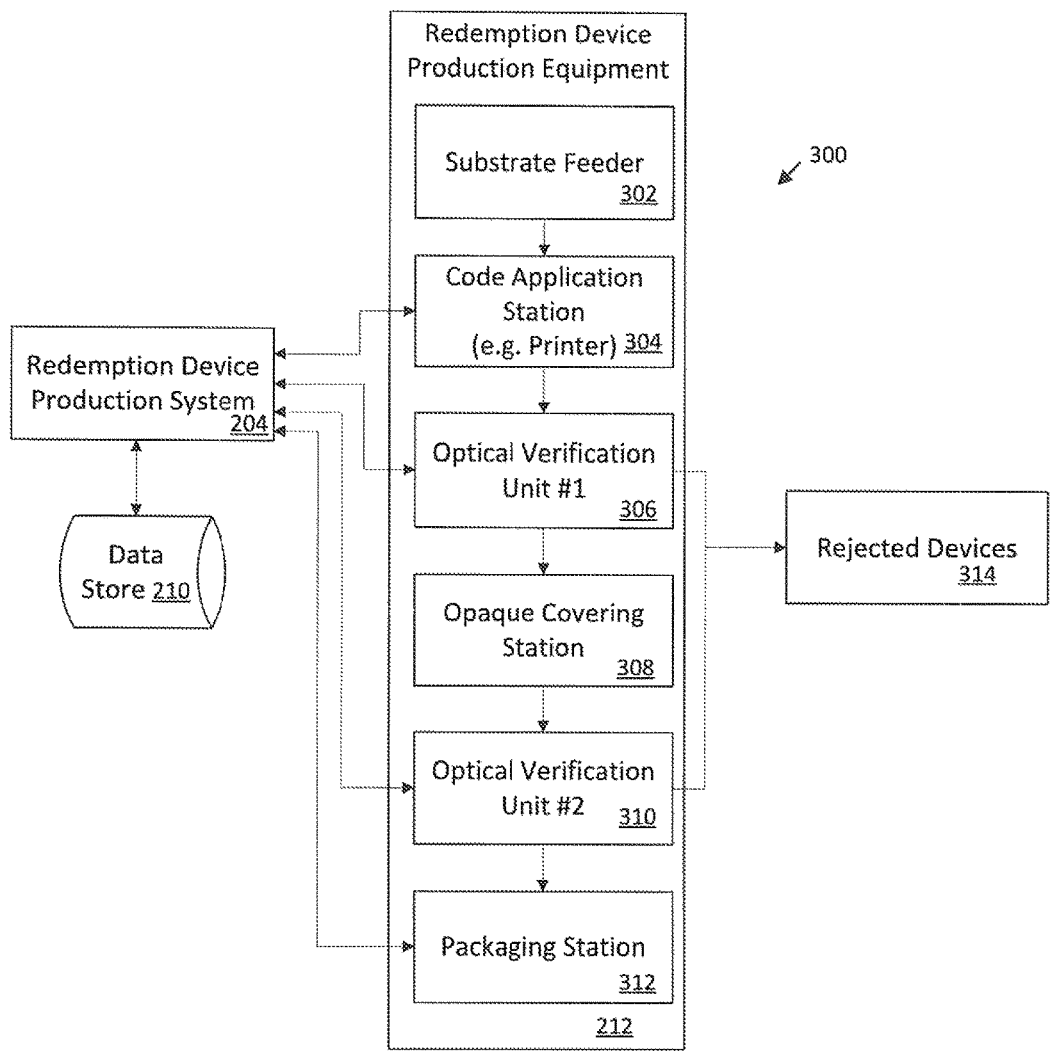
FIG. 3 is a block diagram of a redemption device production system in accordance with an embodiment.

FIG. 3 is a block diagram of a production system 300 for redemption device comprising components of system 222, namely redemption device production system 204 and data store 210 as well as production equipment 212. Production equipment 212 is shown in more detail but it will be appreciated that for purposes of illustrative clarity it is simplified. For example, no conveyance system is shown. No separate computer control or other controls are shown. In the example, production equipment 212 comprises a substrate feeder 302 to feed stock (pre-printed plastic cards as described) to a code application station 304 for applying the verification and redemption codes. The code application station 304 may also apply SKU codes. Code application station 304 may comprise a printer. It may comprise other equipment for applying such codes.

In the present example, code application station 304 receives at least the verification and redemption codes for each respective device 100 that it produces from redemption device production system 204 (whether directly (as shown) or indirectly such as via a computing device controlling some or all or production equipment 212 (not shown). Prior to production, data store 210 stores the verification and redemption codes in association with one another, e.g. so as to permit the lookup of the other code using one of the codes. It preferably also stores the SKU in association with at least one of the verification and redemption codes. The SKU or other data is stored in store 210 to identify the fiat currency value 106 of the redemption device 100.

Following code application station 304, a redemption device bearing codes is provided (e.g. via a conveyancing system) to an optical verification unit 306 comprising one or more imaging devices (e.g. camera(s)), which optically read (e.g. optical character recognition (OCR)) and verify at least the verification and redemption codes for quality assurance purposes. The codes may be communicated to unit 306 from redemption device production system 204 (as shown) or from station 304 (not shown) or in another manner such as described above. It may be that station 306 is coupled to an imaging device and station 304 performs such a function. If a particular redemption device 100 fails verification it is rejected and may be conveyed to a collection of rejected devices 314. These may be recycled.

If verified a device 100 is passed to opaque covering station 308 where the opaque covering is applied. In some examples, a plastic opaque film having a transparent window is applied such as using adhesive or by shrink wrap. In some examples only a portion of the device 100 bearing the redemption code is covered. In some examples other means (e.g. scratch coating) is applied to cover the redemption code. The film may be on a roll that is feed (not shown) to station 308. The film may be preprinted with information, brand, etc.

In the present example, a second optical verification unit verifies that the covering does not obscure at least the verification code. It may also verify that the redemption code is covered. Opaque covering station 308 may be coupled to an imaging device to perform this function. Verification unit 310 may receive the applicable code or codes from production system 204 as shown or from any of the components of equipment 212 as described. Rejected devices 100 are gathered at 314 as described.

Devices with films that are verified are passed to a packaging station 312. There the devices may be packaged (e.g. to boxes) for warehousing prior to delivery/shipping to retailers. Upon packaging the data store may be updated to store an initial status (e.g. not activated) for a device. The status may be updated after final verification and before packaging.

In some examples, boxes are assigned a unique box (serial) number to assist with later activation. The box number may also be used for inventory and shipping purposes. Each device 100 in a box is associated with the box number in data store 210. The box number may be used to look up the respective devices (e.g. linked via a verification code or other means) to update the status (e.g. to activated but not used) at the time of activation. In this way a retailer may quickly activate a plurality of devices 100. The boxes may hold devices 100 having the same or more than one different fiat currency amount 106.

FIG. 3 thus illustrates a production system for a redemption device carrying respective unique verification and redemption codes. The production system may comprise a code application station to apply the respective unique verification and redemption codes to respective redemption devices, the code application station receiving the codes from (a computing device coupled to) a data store storing the respective unique verification and redemption codes in association in respective pairs, the pairs associated with a respective activation status. The code application station is configured to: receive one pair of the respective unique verification and redemption codes; apply a unique redemption code of the one pair to the first portion of the substrate; and, apply the unique verification code of the one pair to a second portion of the face or another face of the substrate. The production system comprises an opaque covering station configured to receive the substrate and apply an opaque covering to the first portion to hide the unique redemption code leaving the unique verification code visible, the covering applied in a manner such that a removal reveals the unique redemption code. When the device is produced and verified, the data store is configured to store the activation status set to not activated.

Figure 4:
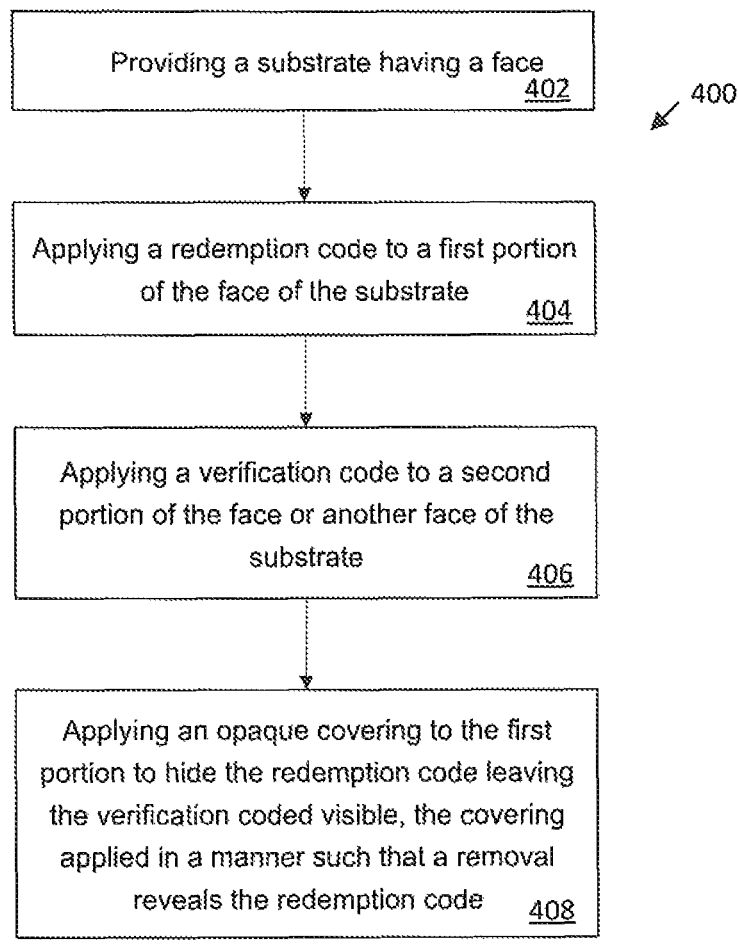
FIG. 4 is a flowchart of a redemption device production process, in accordance with an embodiment.

FIG. 4 is a flowchart of a redemption device production process 400, in accordance with an embodiment. There is illustrated operations of a process to produce a redemption device carrying one or more codes. At 402 operations provide a substrate having a face. At 404, operations apply a redemption code to a first portion of the face of the substrate and then at 406, apply a verification code to a second portion of the face or another face of the substrate. At 408 there is applied an opaque covering to the first portion to hide the redemption code leaving the verification coded visible, the covering applied in a manner such that a removal reveals the redemption code.

As noted the substrate may define a card or ticket. The covering may be adhesively applied or applied by heat shrink or other means. In some examples, the covering is deformed by removal or partial removal such that a re-application of the opaque film to the substrate is detectable.

In some examples, the redemption code and verification code are applied by printing.

A one or both of the redemption code and verification code may comprise one of: a code comprising characters or symbols of a language, including numeric characters; and a machine-readable optical code comprising a 1D or 2D barcode.

The process may comprise storing in a data store the redemption code and verification code in association with one another and providing the data store to make the codes available for production purposes. The data store may be provided to verify at least one of the redemption code and verification code or an activation status.

The process may comprise using a camera and the data store to verify the redemption code and verification code are properly applied to the substrate.

The opaque covering may comprising an opaque portion of a film where the film also has a transparent portion. The process may comprise applying the redemption code and the verification code in a manner such that when the film is applied the redemption code is covered by the opaque portion and the verification code is covered by the transparent portion. The process may comprise using the data store and one of the camera or a second camera to verify the transparent portion is properly applied over the verification code.

The redemption code and verification code may also be stored in association with an activation status such that the verification code is usable to look-up the activation status and when the redemption code is used the activation status is settable to indicate the redemption code is no longer usable or that only a partial amount remains. When all of the amount is spent, the status may be set to the redemption code is no longer usable. The activation status may comprise one of the status as described elsewhere herein.

The process may comprise: producing a plurality of redemption devices each of the devices having respective unique redemption codes and unique verification codes stored in respective association in the data store; and each having respective activation statuses associated with the respective verification codes, the statuses set to not activated; grouping a set of the plurality of redemption devices for shipping together; assigning a unique grouping code to the set and storing the grouping code in the data store in association with the respective verification numbers from the set, the grouping code usable to set the respective activation statuses of the set to activated with redemption code ready for use.

The process may comprise storing the redemption code in a data store in association with an activation status such that when the redemption code is provided to make a purchase of an amount of cryptocurrency, the activation status is determinable from the database and, if activated with redemption code ready for use, a transfer of the cryptocurrency is authorizable to a purchaser and the activation status is settable to indicate the redemption code is used or that a partial amount is remaining as the case may be.

Though not shown, product inventory/shipping system 214 may interface to distribution/activation system 206 to update data store 210 when a box of devices 100 is or individual devices 100 are shipped to a particular retailer such as from a warehouse. The retailer may be associated with the box or individual devices such as for activation purposes or for delivery tracking, inventory management, etc. Delivery may be initiated on demand of a retailer. Delivery process may be controlled by a software program that manages the automatic shipments when inventory levels run low at a retail location.

A retailers may receive a box of cards or several boxes in a delivery. The retailer may activate each box of cards using an electronic interface via a computing device or other communication means (e.g. retailer activation device 216). This electronic interface may comprise a specialized application interface, a website interface, text message interface, a phone IVR system interface, an automated process linked through APIs, etc.) and device 216 may be configured accordingly.

Activating the box of cards activates every card within the box. As an alternative to this, individual cards could be activated using the verification code (Visible Card Number 108) on the card. Activating a box at a time may be much more convenient for retailers.

Figure 5:
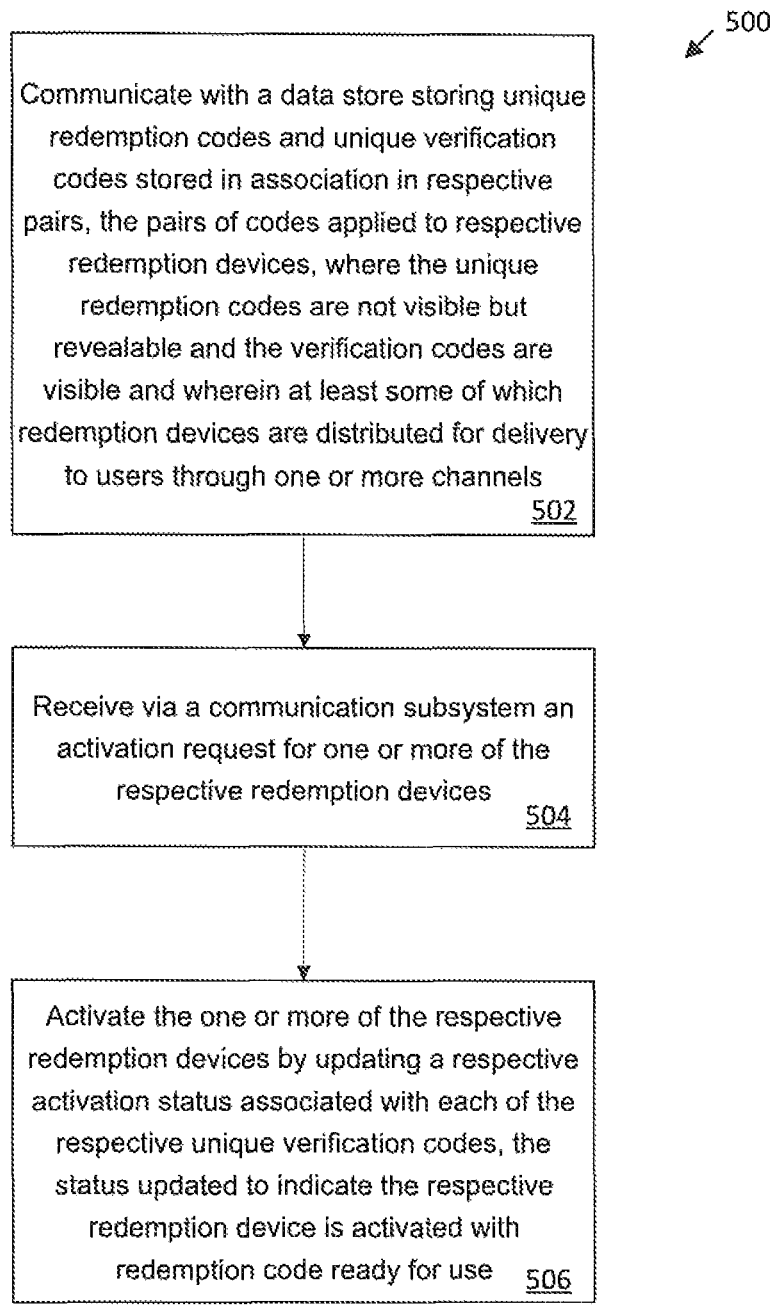
FIG. 5 is a flowchart of a redemption device activation process, showing operations of an activation system in accordance with an embodiment.

FIG. 5 is a flowchart of a redemption device activation process, showing activities of distribution/activation system 206 or another activation system in accordance with an embodiment. Redemption device activation system 206 and the method described facilitates fraud and tamper detection. System 206 may comprise a processor, a communication subsystem and a memory each in communication with the processor. The memory stores instructions which, when executed by the processor, configure the system 206 to perform operations 500 as shown in FIG. 5. At 502 the system 206 is configured to communicate with a data store (210) storing unique redemption codes and unique verification codes stored in association in respective pairs, the pairs of codes applied to respective redemption devices, where the unique redemption codes are not visible but revealable and the verification codes are visible and wherein at least some of which redemption devices are distributed for delivery to users through one or more channels. At 504, operations receive via the communication subsystem an activation request for one or more of the respective redemption devices. At 506 operations activate the one or more of the respective redemption devices by updating a respective activation status associated with each of the respective unique verification codes, the status updated to indicate the respective redemption device is activated with redemption code ready for use.

The unique redemption codes and the respective activation statuses are stored in association such that when a particular redemption code is provided to make a transfer of an amount of cryptocurrency, the activation status is determinable from the data store and, responsive to the status, a transfer of the cryptocurrency is authorizable to a purchaser of the cryptocurrency. As noted the activation status is settable to indicate the redemption code is used or a partial amount remains available if less than the available amount was spent. The data store stores a prepaid currency amount with each pair of codes, the prepaid currency amount being used to determine the amount of cryptocurrency to purchase in response to a redemption of the redemption device. In some examples, less than the available amount may be redeemed in a redemption transaction, leaving a partial amount remaining such as for another redemption transaction.

Operations may be configured to evaluate the respective activation status for a redemption device before activating and operate to only activate by updating the respective activation status if that status is not activated. Operations may be configured to evaluate a respective delivery status for a redemption device and operate to only activate by updating the respective activation status if that delivery status is delivered. A delivery status may be stored in the data store.

The data store may store a unique grouping code (e.g. box serial number) in association with a set of respective redemption devices. The grouping code may be stored in the data store in association with the respective verification numbers from the set, the grouping code usable to set the respective activation statuses of the set to activated with redemption code ready for use. An activation request received at system 206 (e.g. from device 216) may comprises the grouping code to activate all of the set.

Operations may comprising authenticating that the activation request is received from an authenticated user (e.g. retailer) before activating.

An activation confirmation may be provided (e. communicated to device 216 for a retailer). A retailer may authenticate with a user name and password or other means (e.g. voice recognition, two factor authentication, etc.).

It is understood that any status stored in data store 210 as described herein may be coded and need not be the text strings for each status referenced herein. Any reference to a status includes its equivalent.

Though the activation process is described with reference to an activation system such as distribution/activation system 206, retailers and retailer activation device 216 perform complimentary operations. For example, using a retailer activation device, the retailer may invoke an electronic interface to activation system. The retailer may provide input to authenticate to the activation system. The retailer may provide input to provide a grouping code or an individual device verification code and make a request (communication to the activation system) to activate the associated code pairs (respective verification and redemption codes on the devices associated with the code received from the retailer) setting the status to activated with redemption code unused. The associated redemption device 100 is activated though physically it has not changed.

Activated redemption devices 100 may be sold by retailers and purchased by customers. Customers may in turn give or resell such redemption devices 100 to others. Customers (or others) can verify either before or after purchasing a redemption device 100 that it has been activated. The Visible Card Number 108 (i.e. the verification code) that can be seen through the transparent window in the packaging of the redemption device 100 may be verified using an activation system provide a verification function. This isn't a mandatory step. This is a feature for the convenience of customers and others so that they can satisfy themselves that they're not being cheated by the seller (which is more relevant if people are reselling cards).

Figure 6:
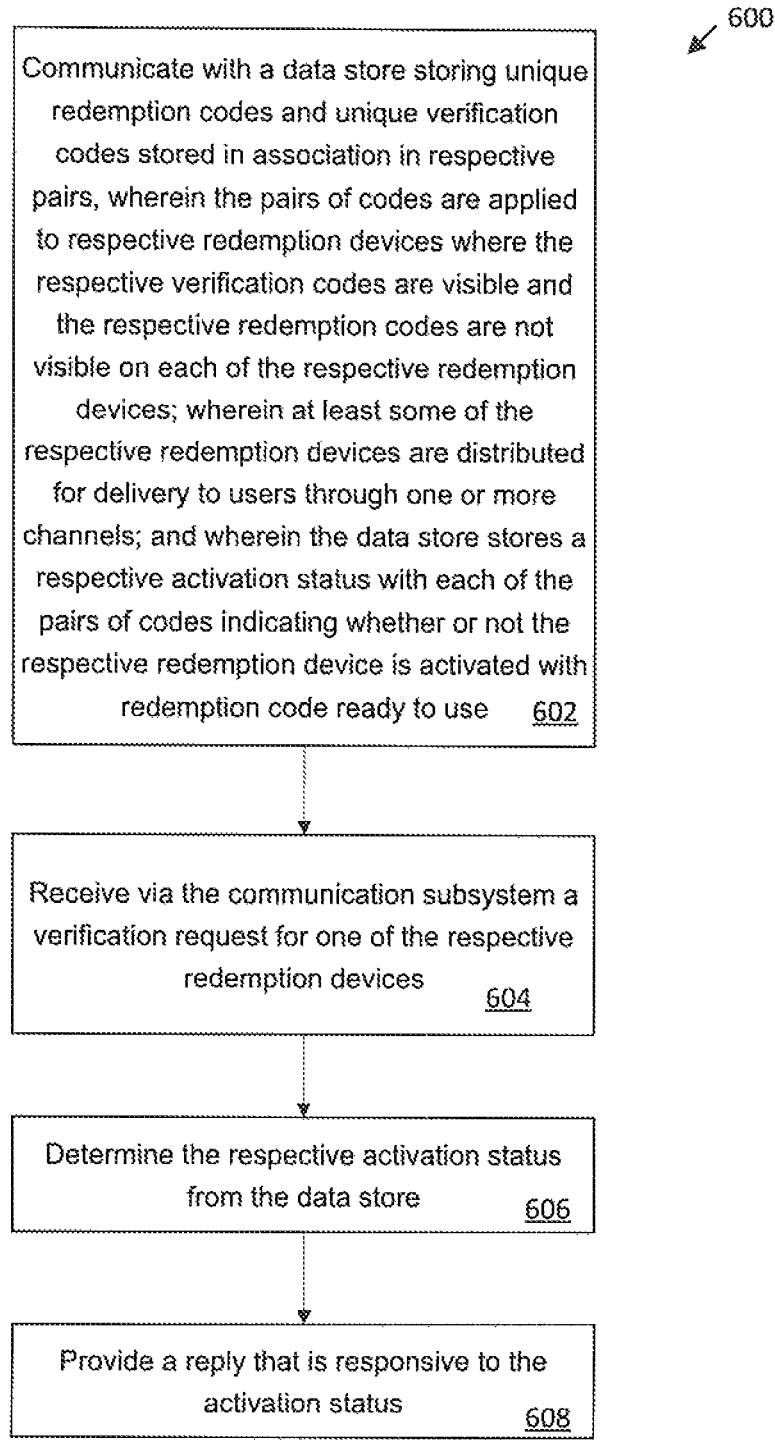
FIG. 6 is a flowchart of a redemption device verification process showing operations of a verification system in accordance with an embodiment.

FIG. 6 is a flowchart of a redemption device verification process showing operations of a redemption device verification system in accordance with an embodiment. Verification system functions may be provided by distribution/activation system 206 or redemption system 208 for example. A redemption device verification system and process may facilitate fraud or tampering detection. Such a system may comprise a processor, a communication subsystem and a memory each in communication with the processor. The memory may store instructions, which when executed by the processor, configure the redemption device verification system to perform operations 600 such as in FIG. 6. At 602 the operations communicate with a data store storing unique redemption codes and unique verification codes stored in association in respective pairs, wherein the pairs of codes are applied to respective redemption devices where the respective verification codes are visible and the respective redemption codes are not visible on each of the respective redemption devices; wherein at least some of the respective redemption devices are distributed for delivery to users through one or more channels; and wherein the data store stores a respective activation status with each of the pairs of codes indicating whether or not the respective redemption device is activated with redemption code ready to use. At 604, operations receive via the communication subsystem a verification request for one of the respective redemption devices. At 606 operations determine the respective activation status from the data store and, at 608, provide a reply that is responsive to the activation status. The verification request comprises the respective verification code of the one of the respective redemption devices. The verification request may be received before or after a purchase of the one of the respective redemption devices. At 606 (though not shown) the verification look up in the database may also determine the amount of fiat currency associated with the device 100. This may be the full amount before any redemption or a partial amount if the card is redeemed in part to purchase less than the full amount of equivalent cryptocurrency. It may be a zero amount if fully redeemed. The available amount may be provided with status.

The data store may update respective activation statuses in response to particular ones of the respective redemption devices being activated after delivery. The data store may update respective activation statuses in response to particular ones of the respective redemption devices being redeemed.

Complementary operations by a customer or other person using a verification device (e.g. a redeeming user device 218) verify a code. For example, input may be received by a verification device which invokes an electronic interface to the verification system. This may be a web interface, phone IVR system, text message interface, application interface etc. similar to described for activation. Input may be received providing a verification code which is communicated in a request to the verification system. A response may be received in reply with a relevant status, where the verification code is used by the verification system to look-up the status. In some examples the available amount is also included in the response as described herein.

To redeem a redemption device 100, a customer or other person in receipt removes the opaque film (e.g. wrapper) to expose the Secret Card Number (redemption code) which is then input into an electronic interface as part of a redemption process.

Figure 7:
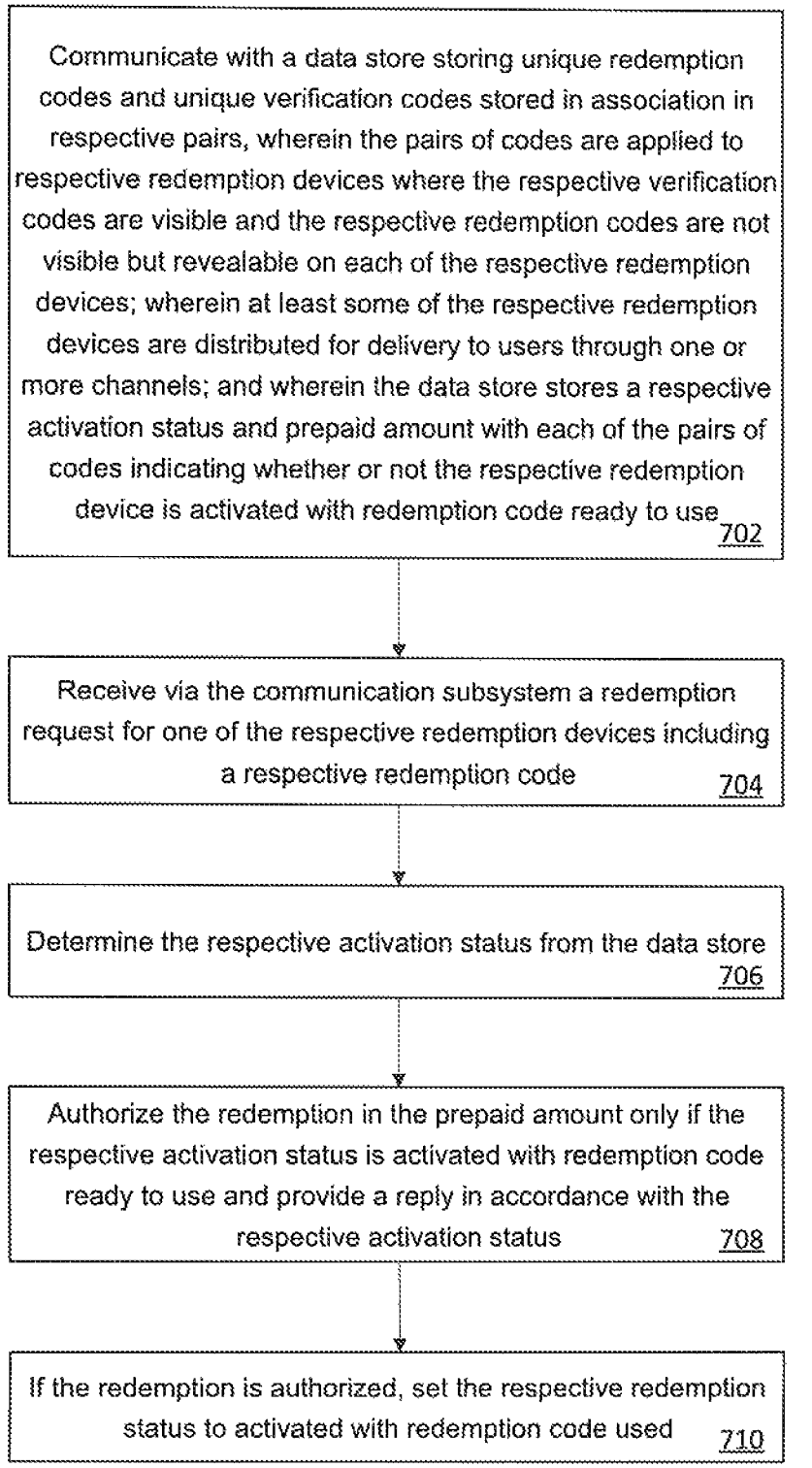
FIG. 7 is a flowchart of a redemption process showing activities of redemption system in accordance with an embodiment.

FIG. 7 is a flowchart of a redemption process showing activities of a redemption system according to an embodiment where the redemption code is a one-time code to spend the full amount of the fiat currency associated with the redemption code. Redemption system functions may be provided by redemption system 208 or another redemption system for example. A redemption system and process redeems a redemption code such as to transfer an amount of cryptocurrency at a prevailing rate to the fiat currency amount 106 of the redemption device 100. Preferably the customer may choose between or among types of cryptocurrencies. Such a redemption system may comprise a processor, a communication subsystem and a memory each in communication with the processor. The memory may store instructions, which when executed by the processor, configure the redemption system to perform operations 700 as in FIG. 7.

At 702 operations communicate with a data store storing unique redemption codes and unique verification codes stored in association in respective pairs, wherein the pairs of codes are applied to respective redemption devices where the respective verification codes are visible and the respective redemption codes are not visible but revealable on each of the respective redemption devices; wherein at least some of the respective redemption devices are distributed for delivery to users through one or more channels; and wherein the data store stores a respective activation status and prepaid amount with each of the pairs of codes indicating whether or not the respective redemption device is activated with redemption code ready to use. At 704 operations receive via the communication subsystem a redemption request for one of the respective redemption devices including a respective redemption code. At 706, operations determine the respective activation status from the data store. At 708 operations authorize the redemption in the prepaid amount only if the respective activation status is activated with redemption code ready to use and provide a reply in accordance with the respective activation status (i.e. redemption). At 710, if the redemption is authorized, operations set the respective activation status to activated with redemption code used. Though not shown in FIG. 7, in another example, the redemption system and data store may be configured to enable less than the available amount of the fiat currency to be spent in a single transaction (e.g. redeeming a portion of the available amount). The portion of the available amount to be spent in a redemption transaction may be received with the redemption request. This portion may be verified against the available amount in the data store to ensure sufficient funds. If a (further) partial amount of the available fiat currency remains after the redemption, the status may be set to indicate a partial amount remains. If none remains, the status is set to activated with redemption code used. The partial amount remaining is stored in the data store.

The operations facilitate a transfer of an amount of cryptocurrency at a prevailing rate using the prepaid amount (or partial amount as indicted in the request to redeem). The operations facilitate the transfer of the amount of cryptocurrency to an address associated with the redemption request.

The redemption request may include a type of cryptocurrency and the operations facilitate the transfer according to the type of cryptocurrency requested. For example the electronic interface may provide a GUI or other interface to specify the type. A plurality of types (e.g. Bitcoin™, Ether™, etc.). Sub types (e.g. Bitcoin Classic) may be specified and are included within a type of cryptocurrency as used herein.

Operations may communicate with a cryptocurrency exchange to obtain an inventory of cryptocurrency which is stored in a secure wallet coupled to the redemption system and the redemption system transfers the amount of cryptocurrency from the secure wallet to the address associated with the redemption request. The redemption request may be received from an interface of a redeeming user's device having a redeeming user's cryptocurrency wallet and the address may be associated with the redeeming user's cryptocurrency wallet.

The redemption system may transfer funds (e.g. using traditional payment networks or otherwise) to one or more third party cryptocurrency exchanges (e.g. QuadrigaCX™, Shapeshift™) to reconcile the system's purchase of its inventory of cryptocurrency to settle/reconcile accounts.

Though described with reference to a redemption system, complimentary operations may be performed by a redeeming user device 218 and its user to redeem a particular redemption device 100. In one example, the particular redemption device may be printed with a QR or similar barcode having the redemption code and preferably verification code encoded therein to invoke a mobile wallet application (e.g. a redeeming user's cryptocurrency wallet) on redeeming user device 218.

Once scanned, a GUI of the wallet application will prompt the redeeming user to input a selection (or type data) of which type of cryptocurrency they would like, if more than one type is offered. The GUI may present the prevailing price (or prices of each, if there are several options displayed). This price may be relative to the type of fiat currency of the prepaid amount associated with the redemption code. In some examples the user may input or select a portion of the prepaid amount or any remaining amount for the transaction. The user then inputs and the wallet application receives the confirmation of the purchase. The request is communicated (e.g. redemption code (and preferably verification code), type of currency, (optionally amount of fiat currency), mobile wallet address) to the redemption system and redemption is performed to transfer the purchased amount of currency to the address of the mobile wallet and update the status in the data store. A request may be defined by more than one communication of the request data to the redemption system.

In another redemption example, the redemption device's codes can be entered into a website or mobile-ready website as part of a redemption process in which a user may input a selection (or type data) of a type of cryptocurrency they'd like to buy. The redeeming user supplies an "address" for where they would like the cryptocurrency to be deposited. The redemption system then sends the amount of the type of cryptocurrency indicated at the prevailing rate using the prepaid fiat currency amount. The status in the data store is updated. This method doesn't require the redeeming user to use any particular blockchain wallet system but it does require that they have one.

The redemption device and systems described herein may be ideal for locations that are not well connected electronically, such as less developed countries or regions. Retailers in developed countries generally sell gift cards using electronic activation at the point of sale. This system doesn't require activation at the point of sale (although it could be done) and activation could be done using a very simple method such as a phone call or text message (to activate a box).

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A process to produce a redemption device carrying one or more codes, the process comprising:
   providing a substrate having a face;
   applying a redemption code to a first portion of the face of the substrate;
   applying a verification code to a second portion of the face or another face of the substrate;
   applying an opaque covering to the first portion to hide the redemption code leaving the verification coded visible, the covering applied in a manner such that a removal reveals the redemption code;
   storing in a data store the redemption code and verification code in association with one another and providing the data store to verify at least one of the redemption code and verification code or an activation status;
   producing a plurality of redemption devices each of the devices having respective unique redemption codes and unique verification codes stored in respective association in the data store; and each having respective activation statuses associated with the respective verification codes, the statuses set to not activated;
   grouping a set of the plurality of redemption devices for shipping together; and
   assigning a unique grouping code to the set and storing the grouping code in the data store in association with the respective verification numbers from the set, the grouping code usable to set the respective activation statuses of the set to activated with redemption code ready for use.

2. The process of claim 1 wherein the substrate defines a card or ticket.

3. The process of claim 1 wherein the covering is adhesively applied.

4. The process of claim 1 wherein the covering is deformed by removal or partial removal such that a re-application of the opaque film to the substrate is detectable.

5. The process of claim 1 wherein the redemption code and verification code are applied by printing.

6. The process of claim 1 wherein a one or both of the redemption code and verification code comprise one of: a code comprising characters or symbols of a language, including numeric characters; and a machine-readable optical code comprising a 1D or 2D barcode.

7. The process of claim 1 comprising using a camera and the data store to verify the redemption code and verification code are properly applied to the substrate.

8. The process of claim 1 wherein the opaque covering is an opaque portion of a film, the film also having a transparent portion and wherein the process comprises applying the redemption code and the verification code in a manner such that when the film is applied the redemption code is covered by the opaque portion and the verification code is covered by the transparent portion.

9. The process of claim 8 comprising using the data store and one of the camera or a second camera to verify the transparent portion is properly applied over the verification code.

10. The process of claim 1 wherein the redemption code and verification code are also stored in association with an activation status such that the verification code is usable to look-up the activation status and when the redemption code is used such that the device is fully redeemed, the activation status is settable to indicate the redemption code is no longer usable.

11. The process of claim 10 wherein the redemption code and verification code are also stored in association with an available amount of prepaid currency and wherein the substrate displays the available amount of prepaid currency before any redemption using the redemption code.

12. The process of claim 1 comprising storing the redemption code in a data store in association with an activation status such that when the redemption code is provided to make a purchase of an amount of cryptocurrency, the activation status is determinable from the database and, responsive to the status, a transfer of the cryptocurrency is authorizable to a purchaser.

13. A production system for a redemption device carrying respective unique verification and redemption codes, the production system comprising:
   a code application station to apply the respective unique verification and redemption codes to respective redemption devices, the code application station receiving the codes from a computing device coupled to a data store storing the respective unique verification and redemption codes in association in respective pairs, the pairs associated with a respective activation status;
   wherein the code application station is configured to:
      receive one pair of the respective unique verification and redemption codes;
      apply a unique redemption code of the one pair to the first portion of the substrate; and,
      apply the unique verification code of the one pair to a second portion of the face or another face of the substrate; and
   an opaque covering station configured to receive the substrate and apply an opaque covering to the first portion to hide the unique redemption code leaving the unique verification code visible, the covering applied in a manner such that a removal reveals the unique redemption code; and
   wherein the production system is configured to:
      produce a plurality of redemption devices each of the devices having respective unique redemption codes and unique verification codes stored in respective association in the data store; and each having respective activation statuses associated with the respective verification codes, the statuses set to not activated;
      group a set of the plurality of redemption devices for shipping together; and
      assign a unique grouping code to the set and store the grouping code in the data store in association with the respective verification numbers from the set, the grouping code usable to set the respective activation statuses of the set to activated with redemption code ready for use.

14. The production system of claim 13 wherein each unique redemption code and respective activation status is stored in association such that when a particular redemption code is provided to redeem a particular redemption device to make a transfer of an amount of cryptocurrency, the activation status is determinable from the data store and, responsive to the status, a transfer of the cryptocurrency is authorizable to a purchaser of the cryptocurrency.

15. The production system of claim 14 wherein the data store stores an available amount of prepaid currency with each pair of codes, the available amount being used to when determining the amount of cryptocurrency to purchase in response to a redemption of the particular redemption device.

16. The production system of claim 13 comprising a first verification station comprising a camera configured to:
   optically read unique redemption code and the unique verification code;

verify a proper application to the substrate using data received from the data store; and accept or reject the redemption device according to whether the proper application is verified.

17. The production system of claim 16 comprising a post-film verification station configured to receive data from the data store and use one of the camera or a second camera to verify the transparent portion is properly applied over unique verification code.

18. The production system of claim 13 in communication with a substrate feeder to feed the substrate to the code application station.

19. The production system of claim 13 wherein the opaque covering is an opaque portion of a film, the film also having a transparent portion; and wherein the opaque covering station is configured to apply the film so that the one of the unique redemption codes is covered by the opaque portion and the one of the unique verification codes is covered by the transparent portion.

20. A redemption device activation system to facilitate fraud and tamper detection, the system having a processor, a communication subsystem and a memory each in communication with the processor, the memory storing instructions which, when executed by the processor, configure the redemption device activation system to:

communicate with a data store storing unique redemption codes and unique verification codes stored in association in respective pairs, the pairs of codes applied to respective redemption devices, where the unique redemption codes are not visible but revealable and the verification codes are visible and wherein at least some of which redemption devices are distributed for delivery to users through one or more channels;

receive via the communication subsystem an activation request for one or more of the respective redemption devices;

evaluate a respective delivery status for each of the one or more respective redemption devices; and activate the one or more of the respective redemption devices if the respective delivery status is delivered by updating a respective activation status associated with each of the respective unique verification codes, the status updated to indicate the respective redemption device is activated with redemption code ready for use.

21. The activation system of claim 20 wherein the unique redemption codes and the respective activation statuses are stored in association such that when a particular redemption code is provided to make a transfer of an amount of cryptocurrency, the activation status is determinable from the data store and, responsive to the status, a transfer of the cryptocurrency is authorizable to a purchaser of the cryptocurrency.

22. The activation system of claim 21 wherein the data store stores an available amount of prepaid currency with each pair of codes, the available amount being used when determining the amount of cryptocurrency to purchase in response to a redemption of the redemption device.

23. The activation system of claim 20 configured to evaluate the respective activation status for a redemption device before activating and only activating by updating the respective activation status if that status is not activated.

24. The activation system of claim 20 wherein the data store stores a unique grouping code in association with a set of respective redemption devices and store the grouping code in the data store in association with the respective verification numbers from the set, the grouping code usable to set the respective activation statuses of the set to activated with redemption code ready for use; and wherein the activation request comprises the grouping code to activate all of the set.

25. The activation system of claim 20 configured to authenticate that the activation request is received from an authenticated user before activating.

26. A redemption device activation system to facilitate fraud and tamper detection, the system having a processor, a communication subsystem and a memory each in communication with the processor, the memory storing instructions which, when executed by the processor, configure the redemption device activation system to:

communicate with a data store storing unique redemption codes and unique verification codes stored in association in respective pairs, the pairs of codes applied to respective redemption devices, where the unique redemption codes are not visible but revealable and the verification codes are visible and wherein at least some of which redemption devices are distributed for delivery to users through one or more channels;

receive via the communication subsystem an activation request for one or more of the respective redemption devices;

activate the one or more of the respective redemption by updating a respective activation status associated with each of the respective unique verification codes, the status updated to indicate the respective redemption device is activated with redemption code ready for use;

wherein the data store stores a unique grouping code in association with a set of respective redemption devices;

wherein the redemption device activation system further stores the grouping code in the data store in association with the respective verification numbers from the set, the grouping code usable to set the respective activation statuses of the set to activated with redemption code ready for use; and wherein the activation request comprises the grouping code to activate all of the set.

27. The activation system of claim 26 wherein the unique redemption codes and the respective activation statuses are stored in association such that when a particular redemption code is provided to make a transfer of an amount of cryptocurrency, the activation status is determinable from the data store and, responsive to the status, a transfer of the cryptocurrency is authorizable to a purchaser of the cryptocurrency.

28. The activation system of claim 27 wherein the data store stores an available amount of prepaid currency with each pair of codes, the available amount being used when determining the amount of cryptocurrency to purchase in response to a redemption of the redemption device.

29. The activation system of claim 26 configured to evaluate the respective activation status for a redemption device before activating and only activating by updating the respective activation status if that status is not activated.

30. The activation system of claim 26 configured to evaluate a respective delivery status for a redemption device and only activating by updating the respective activation status if that delivery status is delivered.

31. The activation system of claim 26 configured to authenticate that the activation request is received from an authenticated user before activating.

* * * * *